Figure 1:
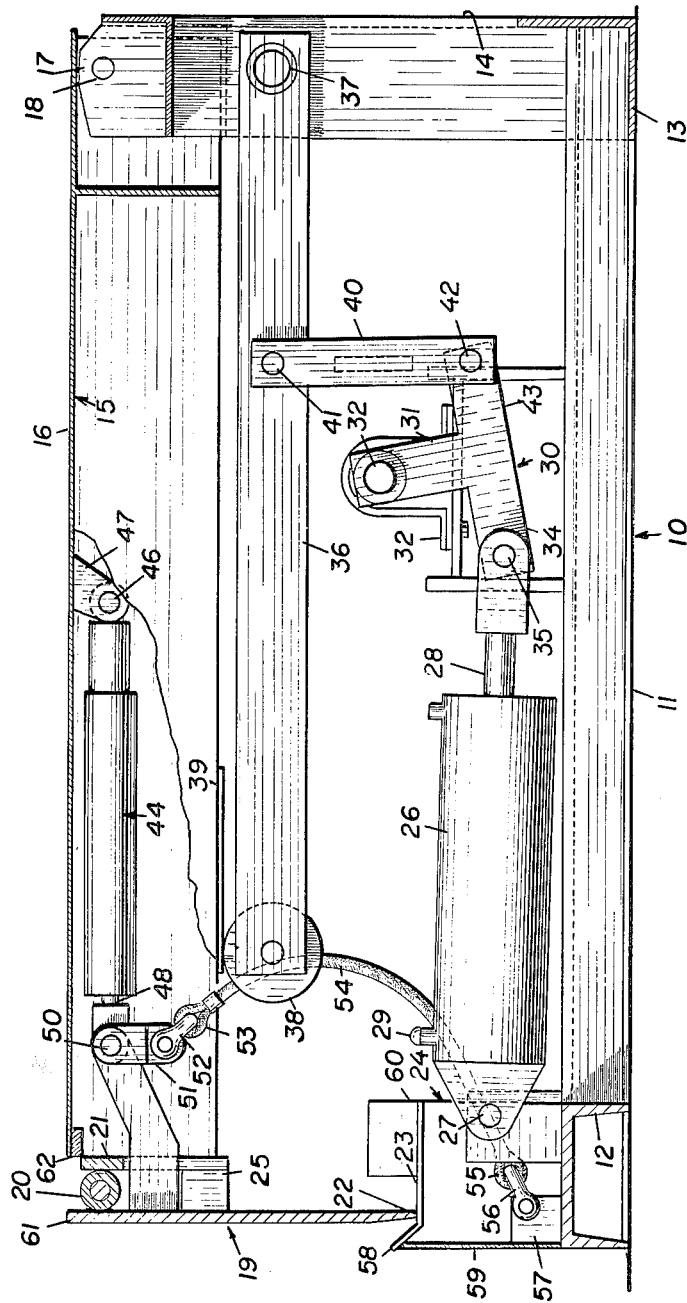

Aug. 24, 1965 R. L. LE CLEAR 3,201,813
HYDRAULICALLY ACTUATED DOCK BOARD WITH HINGED LIP
Filed Feb. 8, 1963 3 Sheets-Sheet 1

INVENTOR
Robert L. LeClear
BY Jacobi & Davidson
ATTORNEYS 3,201,813
HYDRAULICALLY ACTUATED DOCK BOARD
WITH HINGED LIP
Robert L. Le Clear, Albion, Mich., assignor to T & S
 Equipment Co., Albion, Mich., a corporation of
 Michigan
Filed Feb. 8, 1963, Ser. No. 257,124
2 Claims. (Cl. 14—71)

This invention relates to vehicle loading and unloading equipment, and more particularly to a hydraulically actuated dock board having a hinged lip, which dock board is to be installed in a recess in a loading platform, on a frame forward of the platform, or the like to facilitate the loading or unloading of vehicles positioned adjacent the loading platform.

Heretofore, numerous types of dock boards have been proposed and utilized, and many of these dock boards were relatively complex in construction, including both manual and power operated models, and in many cases including a carriage on which a ramp was pivotally mounted, together with means to move the carriage forward or rearwardly to position the ramp of the dock board above the body of a vehicle or to retract the same therefrom. These prior dock boards, while comparatively satisfactory in operation, are relatively costly, and furthermore require considerable maintenance, thereby increasing the over-all cost.

It is accordingly an object of the invention to provide a hydraulically actuated dock board having a hinged lip on the forward end of the dock board ramp, and which may be conveniently installed in a recess in a loading platform, or on a frame forward of the platform, to facilitate the loading or unloading of vehicles.

A further object of the invention is the provision of a hydraulically actuated dock board having a hinged lip on the forward end of the ramp, and in which the lip is automatically raised during upward movement of the dock board, and in which the lip moves downwardly under the action of gravity at a relatively slow speed during downward movement of the ramp.

A still further object of the invention is the provision of a hydraulically actuated dock board having a hinged lip on the forward end of the ramp, and in which the hydraulic actuating means precludes the necessity for providing a counterbalancing means.

Another object of the invention is the provision of a hydraulically actuated dock board having a hinged lip on the forward end of the ramp, and in which such lip, when in vertical position, provides means for supporting the ramp in horizontal position in alignment with the upper surface of the loading platform to permit cross traffic over the dock board.

A further object of the invention is the provision of a hydraulically actuated dock board having a hinged lip on the forward end of the ramp, and in which such lip, when in vertical inoperative position, together with a portion of the frame on which the dock board is mounted, provides a closure for the forward end of the dock board structure between the upper surface of the ramp and the lower surface of the recess in the loading platform in which the dock board is installed.

A still further object of the invention is the provision of a hydraulically actuated dock board having a hinged lip on the forward end of the ramp and in which the entire operation of the dock board, ramp and lip may be controlled by a single control means for operating the hydraulic cylinder of the hydraulic actuating mechanism.

Figure 2:
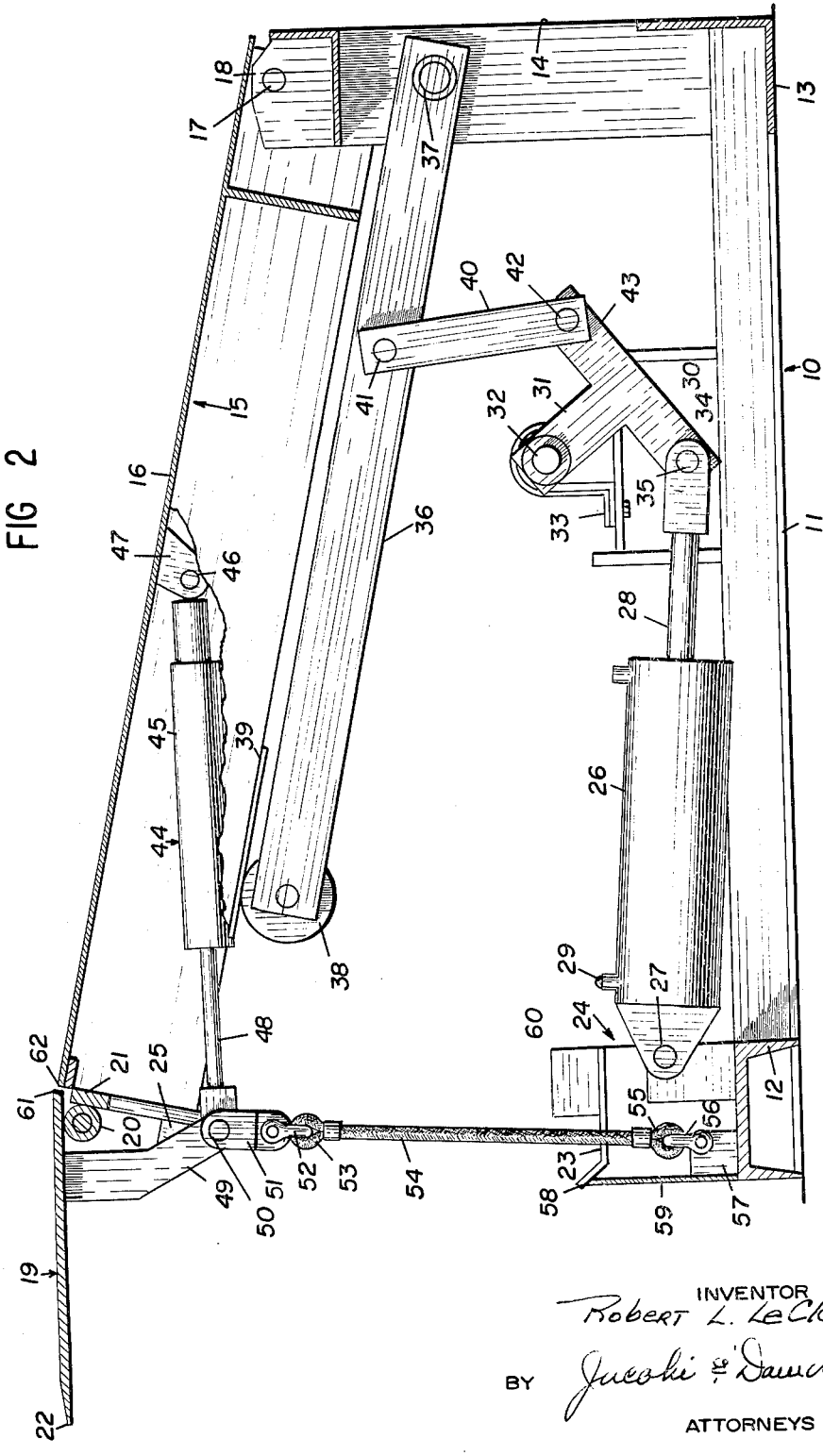
Figure 3:
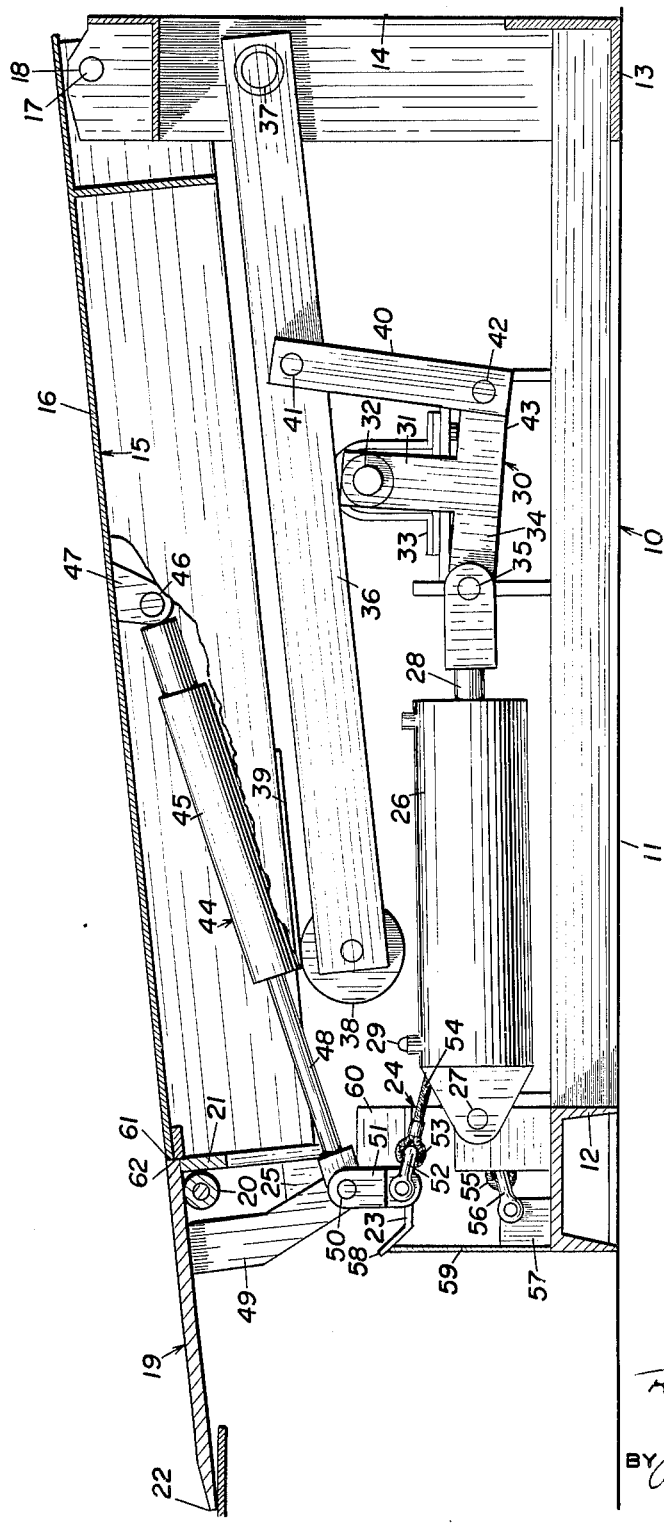

Further objects and advantages of the invention will be apparent from the following description taken in conjunction with the accompanying drawings, wherein:

FIG. 1 is a sectional view showing the ramp of the dock board of this invention in horizontal inoperative position;

FIG. 2 a sectional view showing the ramp in raised position, with the lip partially extended; and, FIG. 3 a sectional view showing the ramp in lowered operative position, with the lip engaging the body of a vehicle.

With continued reference to the drawings, there is shown a hydraulically actuated dock board constructed in accordance with the present invention, and which may well comprise a generally rectangular frame 10 comprising side members 11, a front cross member 12, and a rear cross member 13. Extending upwardly from the rear cross member 13 is a ramp-mounting member 14.

A generally rectangular ramp 15 having an upper load-supporting surface 16 is pivotally mounted adjacent the rear end by a pivot pin 17 received in an aperture 18 in the upper end of the ramp supporting member 14, and a generally rectangular lip 19 is hingedly mounted adjacent the rear edge thereof by hinge means 20 on the forward end 21 of thte ramp 15. The lip 19 normally occupies the vertical position shown in FIG. 1, and in this position the lower end 22 of the lip 19 engages the upper surface 23 of a platform 24 extending upwardly from the forward cross member 12 of the frame 10. The outer or lower end 22 of the lip 19 in engagement with the upper surface 23 of the platform 24, as shown in FIG. 1, serves to support the ramp 15 in a horizontal position in alignment with the upper surface of the loading platform in which the dock board is installed, thereby permitting cross traffic across the ramp 15 of the dock board when such dock board is not in use. Suitable abutment means 25 is provided on the forward end 21 of the ramp 15 for engaging the lip 19 to prevent movement thereof beyond the vertical position, as clearly shown in FIG. 1.

A hydraulic cylinder 26 is pivotally mounted at 27 to a bracket 2 secured to the front cross member 12 of the frame 10, and the hydraulic cylinder 26 is provided with a piston rod 28 and a fluid pressure connection 29. A generally T-shaped rocker arm 30 is provided with an arm 31 pivotally mounted at 32 on a bracket 33 secured to the frame 10, and an arm 34 of the rocker arm 30 is pivotally connected at 35 to the piston rod 28 of the hydraulic cylinder 26.

A ramp elevating bar 36 is pivotally mounted at 37 adjacent the rear end on the ramp mounting member 14 extending upwardly from the frame 10, and the forward end of the ramp raising bar 36 is provided with a rotatably mounted roller 38 which engages a lower surface 39 on the ramp 15. One end of a link 40 is pivotally connected at 41 to the ramp raising bar 36, and the opposite end of the link 40 is pivotally connected at 42 to another arm 43 of the rocker arm 30.

A hydraulic dash pot 44 is provided with a cylinder 45 pivotally connected at 46 to a bracket 47 extending downwardly from the ramp 15, and the cylinder 45 of the dash pot 44 is provided with a piston rod 48 projecting from the forward end thereof. An actuating arm 49 is fixed to the lip 19 and extends rearwardly, and the actuating arm 49 is pivotally connected by a pivot pin 50 to the piston rod 48 of the dash pot 44. Also pivotally connected to the pivot pin 50 is a clevis 51, which in turn is connected by means of a shackle 52 to one end 53 of a cable or other flexible member 54. The cable or flexible member 54 is of a predetermined length, and the opposite end 55 thereof is connected by means of a shackle 56 to a suitable bracket 57 extending upwardly from the front cross member 12 of the frame 10.

The upper surface 23 of the platform 24 is provided adjacent the forward edge thereof with an upwardly inclined flange 58, and extending downwardly from the flange 58 to the upper surface of the front cross member 12 of the frame 10 is a closure plate 59 which, together with the lip 19 in the vertical position shown in FIG. 1, provides a complete closure for the forward end of the dock board structure when the ramp 15 is in the horizontal position, as shown in FIG. 1. Also provided on the upper surface 23 of the platform 24 are one or more blocks 60, the purpose of which will be later described.

When it is desired to operate the dock board, it is only necessary to introduce hydraulic fluid from a suitable source of such fluid under pressure through the inlet connect 29 to the hydraulic cylinder 26, thereby resulting in forcing the piston rod 28 rearwardly, as shown in FIG. 1, to move the rocker arm 30 in a counter-clockwise direction about the pivot point 32 thereof, such movement serving to raise the link 40 and the ramp-elevating bar 36, which, by reason of engagement of the roller 38 with the lower surface 39 of the ramp 15 raises such ramp about the pivot point 17 to any desired elevated position. Upward movement of the ramp 15 serves to remove the slack from the cable 54 will serve to pull the pivot pin 50 downwardly with respect to the ramp 15, and such movement is permitted by reason of the pivotal mounting of the dash pot 44 and the hinge mounting of the lip 19. Such downward movement of the pivot pin 50 also causes downward movement of the rear end of the lip-actuating arm 49, which serves to pivot the lip 19 upwardly about the hinge 20 toward a generally horizontal position in alignment with the upper surface 16 of the ramp 15. Movement of the ramp 15 to an extreme upper position will result in engaging the inner edge 61 of the lip 19 in a recess 62 at the forward end of the ramp 15, at which time the lip 19 is in alignment with the upper surface 16 of the ramp 15.

At this time a truck or other vehicle is in position adjacent the forward end of the dock board, and upon release of fluid pressure from the hydraulic cylinder 26, the ramp 15 will move downwardly under the action of gravity, and since this downward movement releases the tension in the flexible element or cable 54, the lip 19 will also start ot move downwardly under the action of gravity, but such downward movement is at a relatively slow rate, and is controlled by the action of the dash pot 44. It is to be noted that outward movement of the piston rod 48 of the dash pot 44 during upward movement of the lip 19 is substantially free while inward movement of the piston rod 48 is controlled by the structure of the dash pot 44, which permits a slow inward movement of the piston rod 48. The ramp 15 and lip 19 continue to move downwardly until such time as the forward edge 22 of the lip 19 engages the upper surface of the body of the truck or other vehicle, at which time the rear edge 61 of the lip 19 will engage in the recess 62 in the forward end of the ramp 15, and further downward movement of the ramp 15 and lip 19 will be prevented, and the vehicle may be unloaded or loaded over the upper surface 16 of the ramp 15.

Upon completion of the loading or unloading of the vehicle, the ramp 15 may be again raised by the application of fluid pressure to the hydraulic cylinder 26 to disengage the lip 19 from the body of the vehicle, and after removal of the vehicle, the ramp 15 and lip 19 is again permitted to move downwardly, at which time the lip 19 will move to a substantially vertical position, and the outer edge 22 thereof will engage the upper surface 23 of the platform 24 to support the ramp 15 in horizontal position, as shown in FIG. 1. In the event the lip 19 has not moved to a completely vertical position when the outer edge 22 thereof approaches the platform 24, the outer edge 22 of the lip 19 may engage the inclined surface 58 on the platform 24, thereby causing movement of the lip 19 to the vertical position in engagement with the abutments 25 on the ramp 15. Downward movement of the ramp 15 with the lip 19 extended and in engagement with a vehicle is limited by engagement of the lower surface 39 of the ramp 15 with the blocks 60 on the platform 24, and such downward movement limiting means is provided for the purpose of preventing any damage to the operating mechanism by excess downward movement of the ramp 15.

It will thus be seen that by the above-described invention, there has been provided an extremely simple dock board which is hydraulically operated, and may be controlled in all its movements by a single control means for the single hydraulic operating cylinder, which dock board is firmly supported in a horizontal inoperative position to permit cross traffic thereover, and which may be conveniently operated to engage the body of a vehicle, regardless of the height thereof, within the limits of movement of the dock board ramp. It is likewise to be noted that by reason of the use of the hydraulic operating mechanism, no counterbalancing means is necessary, thereby materially reducing the cost of the dock board, and in view of the simplicity of construction, maintenance is reduced to a minimum.

It will be obvious to those skilled in the art that various changes may be made in the invention, without departing from the spirit and scope thereof, and therefore, the invention is not limited by that which is shown in the drawings and described in the specification, but only as indicated in the appended claims.

What is claimed is:

1. A hydraulically actuated dock board comprising:
   a frame means adapted to be disposed with a recess in a loading platform;
   a ramp having a lower surface and a substantially flat upper surface;
   pivotal attachment means securing one end of said ramp to said frame means while leaving the opposite ramp end free from such securing;
   a ramp elevating means including an elongated bar disposed in substantially parallel juxtaposition beneath said ramp;
   said elongated bar having one end pivotally attached to said frame means and an opposite end pivotally mounting a roller;
   said roller abutting against said ramp lower surface;
   hydraulic cylinder and piston means disposed within said frame means beneath said ramp;
   said hydraulic cylinder and piston means having a first end pivotally attached to said frame means and a second end through which a rod from said piston projects;
   mechanical linkage means pivotally attached to said piston rod and to said elongated bar between its ends;
   said mechanical linkage means including a rocker arm and a link, said rocker arm being centrally pivoted to said frame means with one end thereof pivotally attached to said piston rod and with the other thereof pivotally attached to the lower end of said link, said link extending upward and having its upper end pivotally attached to said elongated bar;
   said mechanical linkage means being operative, when said piston rod is extended, to raise said elongated rod and hence to raise said ramp and being operative, when said piston rod is retracted, to lower said elongated rod and hence to lower said ramp;
   a lip pivotally mounted adjacent said ramp free end and normally hanging perpendicularly downward from said ramp under the influence of gravity;
   said lip having a lower surface and a substantially flat upper surface;
   an actuating arm projecting from said lip lower surface;
   dashpot means interconnected between said lip and said ramp to control the speed of relative movement therebetween;
   said dashpot means including a fluid pressure device having a fixed end pivotally attached to said ramp lower surface and an extensible end pivotally connected to said lip actuating arm;

a flexible member of preselected length;

said flexible member having one end pivotally attached to said frame means and having an opposite end pivotally attached to said pivotal connection between said dashpot extensible end and said lip actuating arm;

said hydraulic cylinder and piston means being selectively actuatable to eleveate said ramp whereby, when said ramp elevates beyond the length of said flexible member, said lip will be pivoted upward until its upper surface is substantially coplanar with said ramp upper surface;

said hydraulic cylinder and piston means being selectively deactuatable to lower said ramp whereby, when said ramp lowers far enough to provide slack in said flexible member, said lip will move slowly in a downward direction under the influence of gravity, with the speed of said downward movement being limited by said dashpot means.

2. A hydraulically actuated dock board as defined in claim 1 wherein said link upper end is pivotally attached between the ends of said elongated bar.

References Cited by the Examiner

UNITED STATES PATENTS

| | | | |
|---|---|---|---|
| 2,689,965 | 9/54 | Fenton | 14—71 |
| 2,714,735 | 8/55 | Watson | 14—71 |
| 3,061,855 | 11/62 | Layne | 14—71 |
| 3,117,332 | 1/64 | Kelley | 14—71 |

CHARLES E. O'CONNELL, *Primary Examiner.*

JACOB L. NACKENOFF, *Examiner.*